No. 741,491. PATENTED OCT. 13, 1903.
P. J. HEDLUND.
STEAM TURBINE.
APPLICATION FILED MAR. 30, 1903.
NO MODEL.
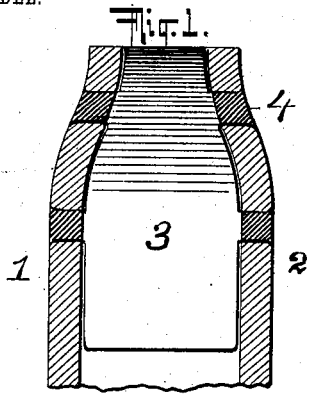
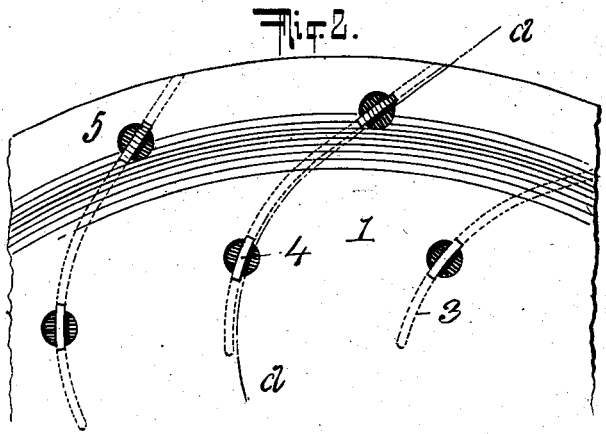
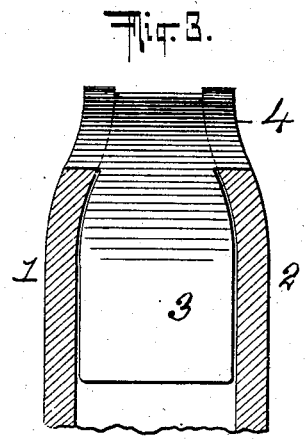
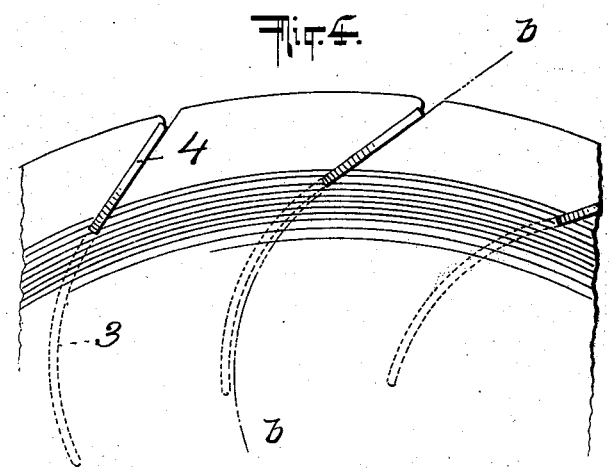
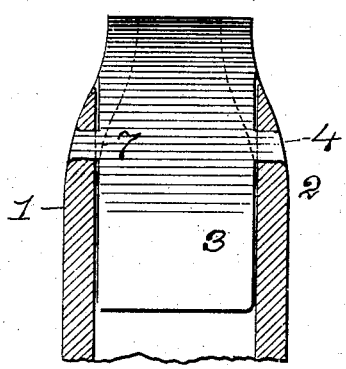
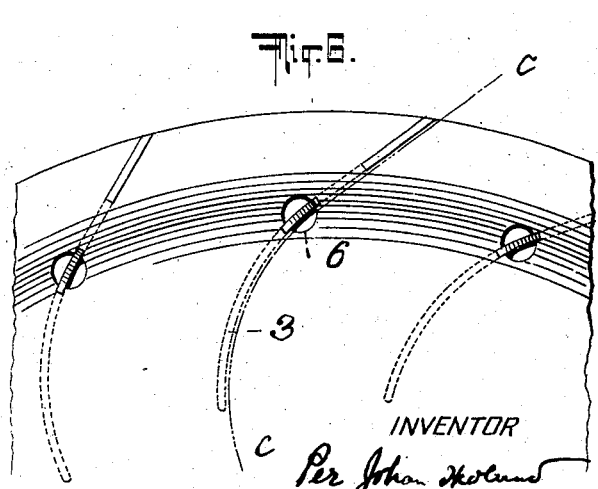
WITNESSES
Gustav Dieterich
Edwin H. Dieterich
INVENTOR
Per Johan Hedlund
BY Laurie Benjamin
ATTORNEY No. 741,491. Patented October 13, 1903.

UNITED STATES PATENT OFFICE.

PER JOHAN HEDLUND, OF STOCKHOLM, SWEDEN.

STEAM-TURBINE.

SPECIFICATION forming part of Letters Patent No. 741,491, dated October 13, 1903.

Application filed March 30, 1903. Serial No. 150,251. (No model.)

*To all whom it may concern:*

Be it known that I, PER JOHAN HEDLUND, of Stockholm, Sweden, have invented a new and useful Improvement in Steam-Turbines, of which the following is a specification.

The invention relates to a turbine-wheel, and more particularly that type of turbine-wheel known as the "outward-flow," in which the working fluid enters the center of the wheel and escapes between buckets disposed at its circumference.

The invention consists more particularly in the mode of attachment of the wheel-buckets.

In the accompanying drawings, Figure 1 is a section of the outer portion of a turbine-wheel embodying my invention on the line *a a* of Fig. 2. Fig. 2 is a side elevation thereof. Fig. 3 is a section on the line *b b* of Fig. 4, and Fig. 4 is a side elevation showing a modification of my device. Fig. 5 is a section on the line *c c* of Fig. 6, and Fig. 6 is a side elevation showing still another modification.

Similar numbers of reference indicate like parts.

At 1 and 2 are represented the usual heads of a turbine. Said heads are inwardly inclined near their circumference, so as to produce a contracted escape-opening.

In the form shown in Fig. 1 the bucket 3 is made of a shape to fit transversely between heads 1 and 2 and is provided with two lugs or ears 4 on each side, adapted to enter holes formed in said heads. After the lugs have been inserted in the holes the protruding ends are riveted down, as shown in Fig. 1, and plugs 5 are driven into each aperture on each side of the lugs to fill the same.

In the construction shown in Fig. 3 instead of holes made in the heads 1 and 2 said heads are provided with elongated recesses extending inward from their circumference and suitably spaced apart, into which recesses extend the lugs 4, which project from said buckets, near the outer ends thereof. After these lugs have been inserted in the recesses they are riveted down, as already described.

In Fig. 5 the bucket enters milled cuts or recesses, inwardly communicating with which are the holes 6, through which pass the lugs 4, these lugs being riveted over on the outside, as already explained in connection with Fig. 1. In this last case it is not necessary to introduce the plugs 5 in the holes 6, since the metal on each side of the bucket-faces, as shown at 7, Fig. 5, is sufficient to make a tight joint.

Of course it will be understood that in assembling all of these parts the lug or lugs 4 are first inserted in the opening or openings in one head and the other head is applied to the opposite lugs, after which the lugs may be riveted over in the manner already described.

I claim—

1. In an elastic-fluid turbine, two wheel-heads inwardly inclined at their circumferential periphery to form a contracted outlet and provided with openings, and a bucket constructed to fit between said inclined heads and provided on its side edges with integral lugs adapted to enter said openings.

2. In an elastic-fluid turbine, two wheel-heads each having a recess at its circumference and on its inner side and an opening intersecting said recess and a bucket disposed between said heads with its edges disposed in said recesses and provided with lugs on said edges received in said openings.

3. In an elastic-fluid turbine, two wheel-heads each having a straight recess at its circumference and on its inner side and an opening intersecting said recess and a bucket having a straight portion and a curved portion disposed between said heads with the edges of its straight portion disposed in said recesses and provided with lugs on said edges received in said openings.

In testimony whereof I have signed my name to this specification in the presence of two subscribing witnesses.

PER JOHAN HEDLUND.

Witnesses:
 WM. H. SIEGMAN,
 I. A. VAN WART.